Oct. 18, 1960  S. M. BERNSTEIN  2,956,497
PORTABLE COMBINATION ELECTRIC ROTISSERIE AND CHARCOAL BROILER
Filed Oct. 8, 1958  4 Sheets-Sheet 4
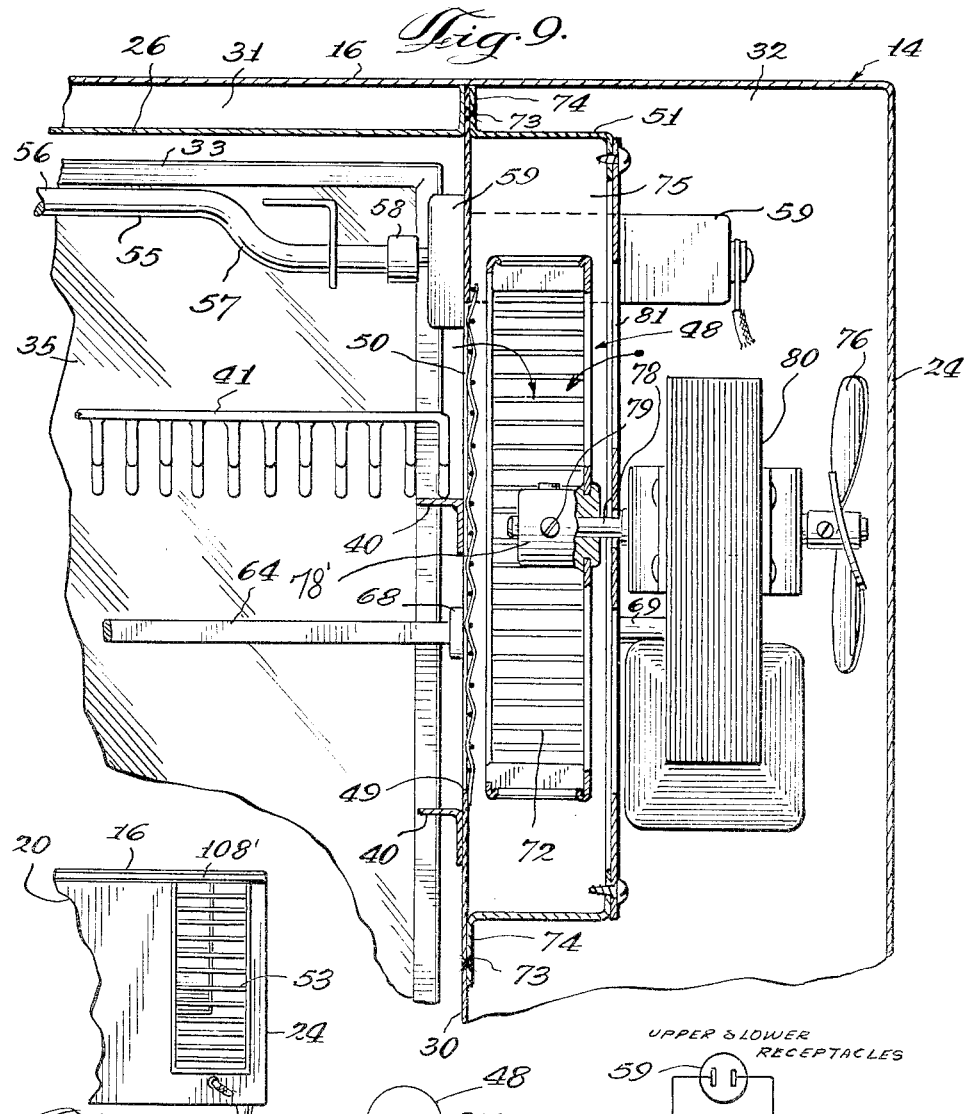
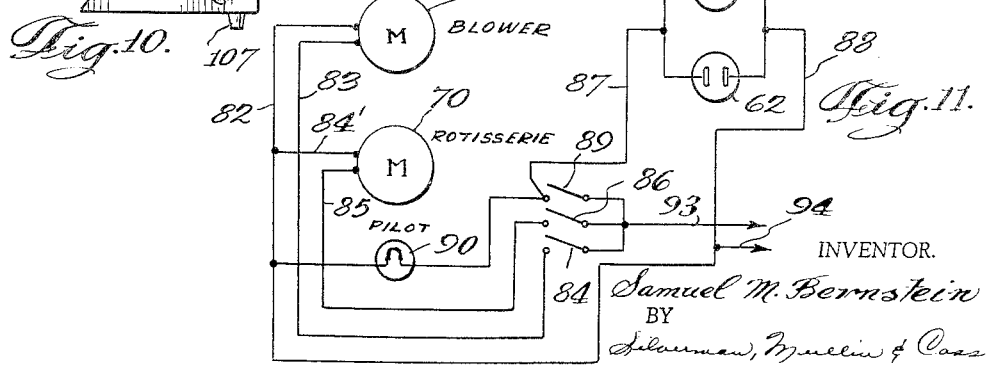
INVENTOR.
Samuel M. Bernstein
BY
Silverman, Mullin & Cass
ATTORNEYS United States Patent Office 2,956,497
Patented Oct. 18, 1960

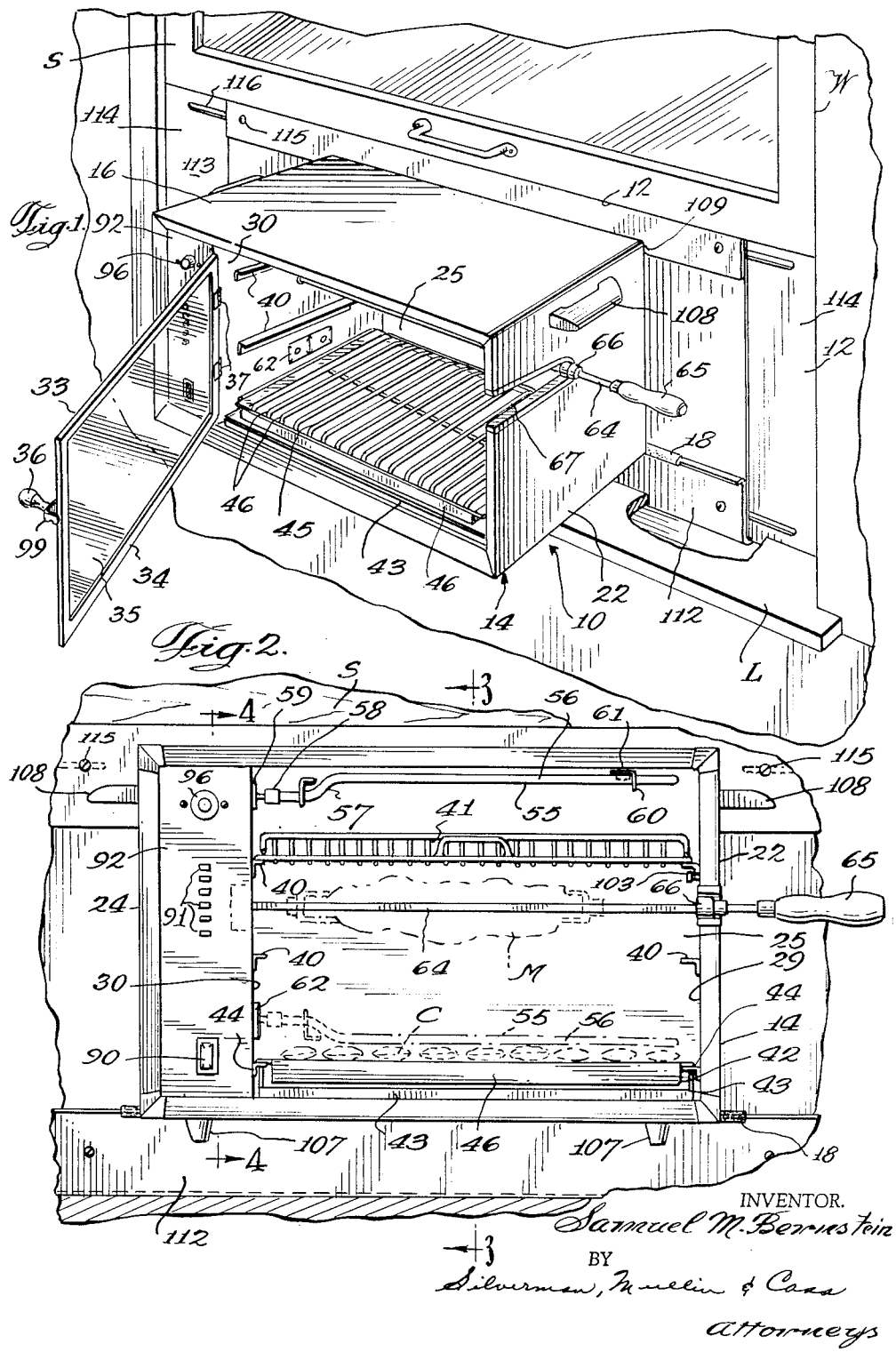

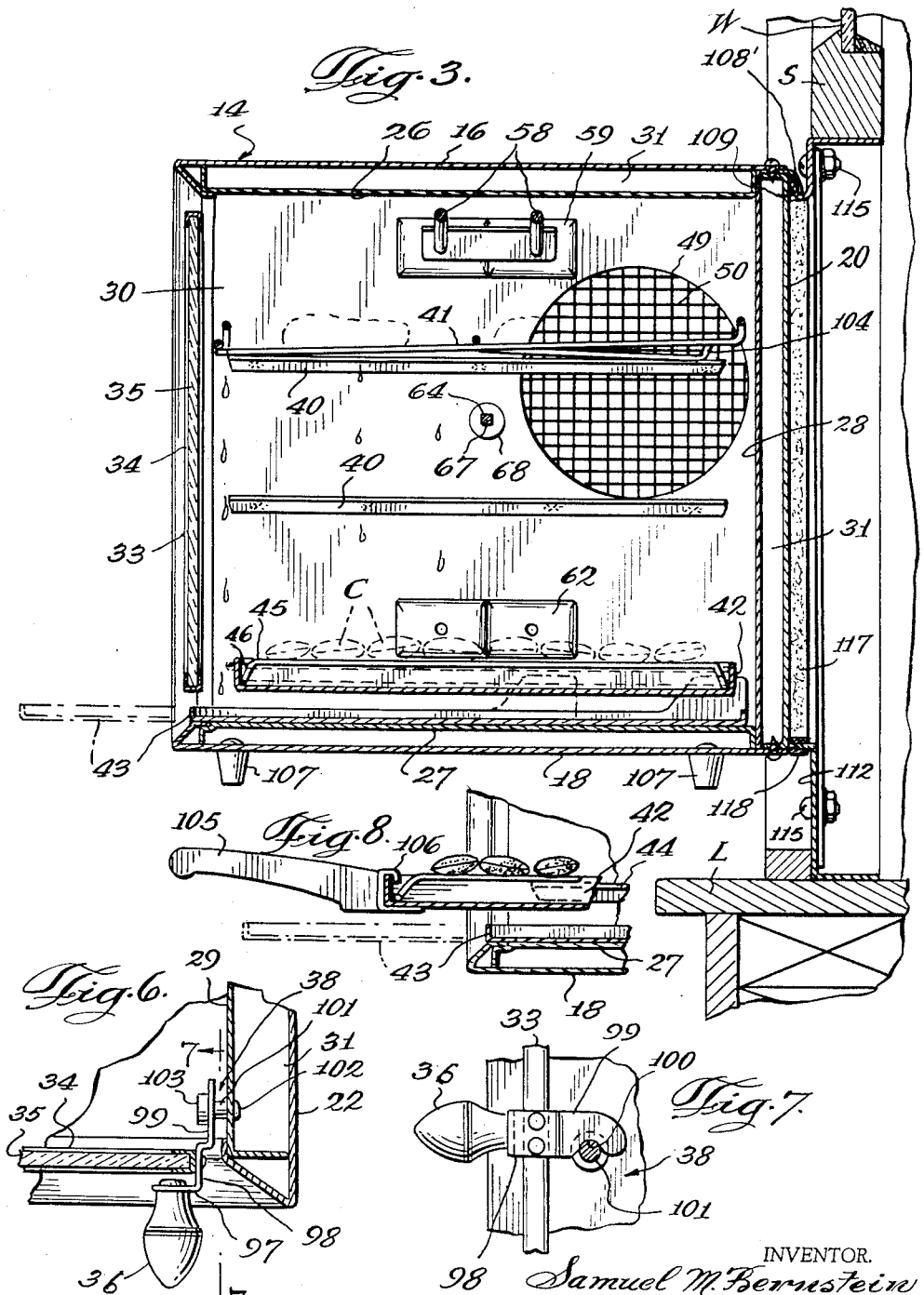

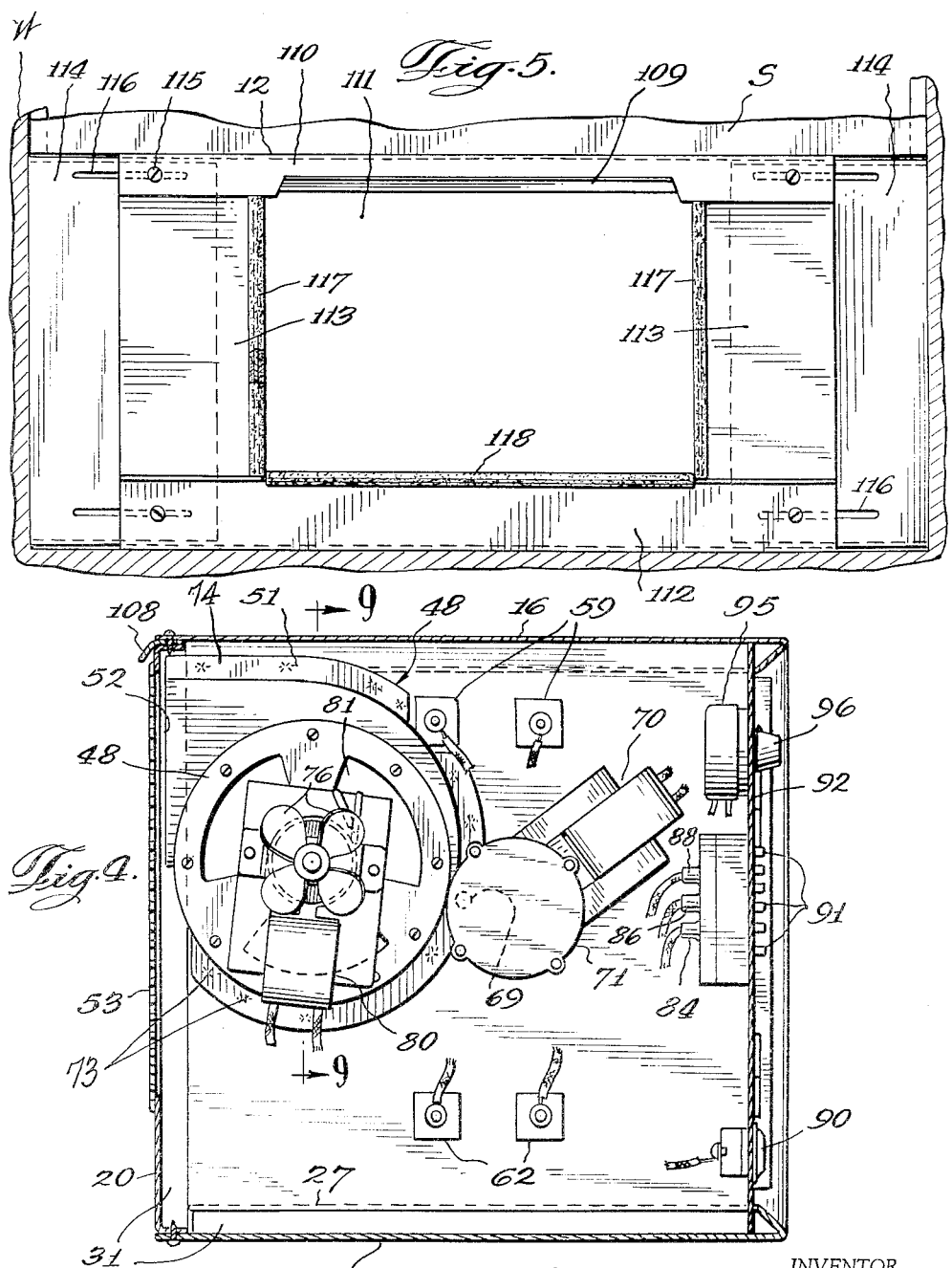

2,956,497
PORTABLE COMBINATION ELECTRIC ROTISSERIE AND CHARCOAL BROILER

Samuel M. Bernstein, 196 Sheridan Road, Winnetka, Ill.

Filed Oct. 8, 1958, Ser. No. 766,107

9 Claims. (Cl. 99—421)

This invention relates generally to portable cooking devices and more particularly to an improved portable blower-exhausted charcoal broiler or barbecue device combined with an electric broiler and rotisserie. Specifically, the invention relates to a portable unit having a cooking chamber and with means for mounting the device in a window opening or the like so that the exhaust end of the device is positioned outdoors, said device having a blower for exhausting the products of combustion such as smoke, odors, fumes, and the like, from the cooking chamber to the outside atmosphere; and said unit being of the type disclosed in the co-pending application of Samuel M. Bernstein, Morton Fischel and Sydney Fischel, Serial No. 715,269, filed February 14, 1958, now Patent No. 2,929,373, issued March 22, 1960, and entitled Portable Fan-Exhausted Cooking Device. More specifically, this invention relates to improvements in said cooking device including the incorporation therein of a removable heating element and means enabling said heating element to be used for broiling purposes or in connection with a rotisserie for barbecuing purposes, and finally in connection with combustible fuel such as charcoal, as a combustion igniter therefor. This application comprises a continuation-in-part of the aforementioned co-pending application.

Heretofore, the use of portable charcoal broilers, barbecues, rotisseries and the like, has been well known, and in recent years their use has become increasingly widespread. Such devices, however, are open and hence usable only outdoors. Thus, their application is confined to use only during the warm weather season or in warm climate areas.

In recent years enclosed electric table broilers and rotisseries have also become popular for use indoors. Although generally charcoal broiling or barbecuing is considered to be the preferred method for preparing a number of foods, since the taste imparted by such method is considered preferable, nevertheless, electric table broilers and rotisseries have become quite popular because of their convenience, especially because of the elimination of all fuss or bother in connection with fuels and residues.

It is therefore apparent that both of the above described cooking devices probably have their place in the modern home. It is also apparent that there has been a long-felt need for a device which will enable the preparation indoors of charcoal broiled foods. It is obvious also that there exists a long-felt need for a single cooking unit affording selective means for both charcoal broiling and barbecuing as well as broiling and barbecuing by electrically generated heat.

It is therefore an important object of this invention to afford a portable electric table broiler and rotisserie combined in a charcoal broiling unit enabling the preparation indoors of charcoal broiled or barbecued foods. For the latter purpose, the device is provided with means for exhausting the products of combustion and cooking to the outside atmosphere. Such a device comprises a charcoal broiling chamber having means for collecting and exhausting smoke, fumes, and other products of combustion and cooking to the outside atmosphere. This is accomplished by constructing the unit with an exhaust outlet at one end and with means for mounting the unit in a building opening such as a window so that the exhaust outlet is positioned outdoors. The cooking oven or chamber remains indoors. The unit is further provided with means for collecting the smoke, fumes and other products of combustion and exhausting the same through the exhaust outlet to the outside atmosphere.

Another important object of this invention is to provide a portable, fan-exhausted, cooking unit in which the exhaust means further functions to support the combustion of the charcoal fuel or the like in the cooking unit.

One of the problems encountered in charcoal broiling units especially those designed for indoor use as disclosed in the aforementioned co-pending application, is the fuel ignition. Heretofore, in outdoor charcoal broilers, highly inflammable igniting fluids have been used to facilitate the ignition of the charcoal. However, the use of such inflammable and volatile fluids in enclosed areas, especially in a home, is somewhat dangerous and ofttimes may cause accidental conflagrations.

It is therefore another important object of this invention to afford some means for igniting the charcoal in cooking units of the type hereinabove described. An object relating thereto is to provide an electric heating element removably positioned adjacent the charcoal so that the element may conveniently ignite the fuel without necessitating the use of any inflammable igniters or even other conventional ignition materials such as matches or the like.

Still a further object is to provide means in a cooking unit of the character described enabling said heating element igniter to be repositioned for use as the cooking element itself.

Still another object is to provide a cooking unit of the character described having improved means for collecting and exhausting the products of combustion to the outside atmosphere.

Yet a further object is to afford a cooking device of the character described so designed that the same may be readily mounted in operational position in a building opening such as a window when it is desired to use the unit as a charcoal broiler; but further designed so that the same may be conveniently removed and positioned on a table or the like when it is desired to use the unit as an electric table broiler or rotisserie. An object relating thereto is to provide window mounting means which may be permanently affixed in a window opening, said means having a member adapted to cooperate with a complementary member provided on the back of the cooking unit enabling the cooking unit to be readily hung in the window opening without requiring any other attaching or mounting operations.

Yet a further object is to provide a portable combination electric rotisserie and charcoal broiler of simple inexpensive construction, yet sturdy and attractive, said combination unit affording at least two methods for preparing foods with a choice of at least two different types of fuels; the cost of said unit being at most only slightly more than the cost of a unit designed to afford only one method of cooking such as either a charcoal broiler or an electric table broiler or rotisserie.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a portable blower-exhausted combination charcoal broiler and electric rotisserie cooking unit embodying the principles of my invention and showing the same mounted through a window as viewed from the interior of the building;

Fig. 2 is a front elevational view of the unit shown in Fig. 1 with the door removed;

Fig. 3 is a cross sectional view taken on the plane of line 3—3 in Fig. 2 showing the door back in place;

Fig. 4 is another sectional view taken on the plane of line 4—4 in Fig. 2 of the drawings and viewed in the direction indicated;

Fig. 5 is a front elevational view of the window mounting panel shown in operational position in a fragmentary portion of a window frame;

Fig. 6 is an enlarged fragmentary sectional view showing the door fastening detail of construction;

Fig. 7 is a sectional view taken on the plane of line 7—7 in Fig. 6 of the drawings and viewed in the direction indicated;

Fig. 8 is another enlarged, fragmentary partially sectional view showing another detail of construction;

Fig. 9 is an enlarged fragmentary sectional view taken on the plane of line 9—9 in Fig. 4 of the drawings and viewed in the direction indicated;

Fig. 10 is a fragmentary rear elevational view showing a detail of construction; and Fig. 11 is a diagrammatic and schematic view of the electrical components and wiring circuits of the device.

Referring first to Fig. 1 of the drawings, reference numeral 10 indicates generally the cooking device mounted in a window W by means of an adjustable slidable panel 12 mounted in the window opening so that the same abuts the window ledge L. It should be noted that the mounting device 12 may be positioned in front of the window sash S so that the same does not interfere with the raising and lowering of the window sash S during the opening or closing of the window. However, as shown in the embodiment illustrated in the drawings the panel is positioned in alignment with the sash S which may be lowered to abut the top of the panel 12 in sealing relationship.

The unit 10 may comprise a housing indicated generally by reference numeral 14. The housing 14 may be of generally rectangular shape defined by a top wall 16, a bottom wall 18, a rear wall 20, and a pair of side walls 22 and 24 respectively.

Positioned within said housing 14 is a cooking chamber 25 which in turn is defined by inner walls such as inner top wall 26, bottom wall 27, back wall 28, and side walls 29 and 30 respectively. It should be noted that all of said inner walls are spaced from the aforementioned outer walls to afford insulating air spaces such as 31 therebetween. It should further be noted that inner side wall 30 is spaced from outer side wall 24 considerably more than the opposite inner and outer side walls 28 and 29 respectively. The purpose therefor is to afford a chamber 32 of sufficient dimension to enable the mounting therein of various electrical components which will be disclosed as the description proceeds (see Fig. 9).

The cooking chamber 25 opens forwardly (away from the window) and may be closed by a door 33 hingedly mounted as shown in Fig. 1 of the drawings. For convenience and visibility, the door may comprise a metal frame 34 with a panel of heat resistant transparent glass 35 mounted therein. A handle 36 may be affixed on the side of the door opposite the hinges 37 and a latching device indicated generally by the reference numeral 38 may be utilized for facilitating the opening and closing of said door. The structure of said latching device will be disclosed as the description proceeds.

Pairs of mounting brackets such as 40 may be affixed in aligned positions to the inner side walls 29 and 30 for the purpose of supporting a grille such as 41 in removable spaced relationship above a pan 42. The pan 42 is in turn supported in spaced relationship above the bottom inner wall 27 and a drip pan 43 removably positioned thereon, by means of a pair of support brackets 44 affixed in aligned position, one to each of the inner side walls 29 and 30. A fuel supporting grille 45 may be removably positioned within the pan 42 and spaced from the bottom of said pan by bent leg portions such as 46 (see Fig. 3). Fuel such as charcoal briquettes C may be positioned on said grille 45 and ignited (in a manner to be subsequently disclosed) for the purpose of charcoal broiling or barbecuing a piece of meat M as shown in Fig. 2 of the drawings.

Since the combustion of charcoal, or similar solid fuels, is necessarily accompanied by the emission of smoke and other products of combustion it is apparent that means must be provided for collecting an exhausting said products of combustion from the cooking chamber to the outside atmosphere in order to prevent said smoke fumes, etc., from escaping to the atmosphere of the room. As in the aforementioned co-pending application exhaust means are provided, but in this case, instead of an ordinary exhaust fan, a blower indicated generally by reference numeral 48 is more effectively utilized. The blower 48 is positioned in the chamber 32 and communicates with the cooking chamber 25 by means of a large annular opening 49 closed by a protective grid 50. The blower 48 is adapted to collect the atmosphere of the chamber 25, drawing the same in through the grid 50, conducting it through the scroll 51 and then exhausting said collected atmosphere through an exhaust opening 52 of the scroll and out to the outside atmosphere through a grid-covered exhaust opening 53 formed in the back wall 20, as shown in Figs. 4 and 10 of the drawings. The aforementioned blower and exhaust system will be described in greater detail as the description proceeds.

The preceding description to this point has been concerned primarily with that portion of the structure of the herein invention relating to the charcoal broiling function of the cooking device in a manner similar to that disclosed in the aforementioned co-pending patent application. However, as previously indicated, the subject invention is not limited to this form of food preparation but is so designed and constructed that food may be prepared by electric broiling or barbecuing.

For the aforementioned purpose the device is provided with a removable heating unit 55 which in turn may comprise an elongated rod 56 bent or offset intermediate its length in spaced relationship with one end as at 57 and the function of which will become apparent as the description proceeds. The end of the rod 55 adjacent the offset portion 57 is provided with a male electrical plug member 58 adapted to be plugged into an electrical receptacle 59 provided in the upper portion of inner side wall 30 (see Figs. 2 and 9). When the heating element 55 is positioned as indicated above and illustrated in the drawings it will be noted that the same may be used much in the same manner as the heating element in the usual table broiler. In order to afford proper support for the heating element the same may be provided with a bracket 60 at one end having a slotted member adapted to cooperate with a downwardly protruding headed member such as 61 to thereby better support the element in operational position. It will be noted that the offsetting 57 of the rod enables the effective length of the same to be properly spaced from the grille 41 when the same is positioned on the upper brackets 40.

When it is desired to broil the food, the same may be positioned on the tray 41 which then may either be positioned on the upper brackets in the position shown in Figs. 2, 3 and 9 of the drawings or for slower broiling, the grille 41 may be positioned in further spaced relationship with the heating element by positioning the same on the lower brackets 40.

As was previously stated, the heating element 55 may be removably positioned in the electrical receptacle 59 when it is desired to use it as a heating element. However, said element has another function; namely, as an igniter for the charcoal C. For this purpose, the rod may be unplugged from the receptacle 59, rotated 180° so that the offset portion 57 is downwardly directed, and the unit then plugged into a lower positioned receptacle 62 as shown in dotted outline in Fig. 2 of the drawings. In this position, it will be noted that the rod portion 56 of the element 55 is positioned in close proximity with the charcoal briquettes C. It will therefore be apparent that in this position the rod 56 in its heated condition acts as an igniter to electrically ignite the charcoal briquettes C. Obviously, when the device is being used as a charcoal broiler, there is no necessity for using the heating element in its upper position as a source of heat for cooking.

Referring now to Figs. 1, 2 and 9 of the drawings, it will be noted that the device is provided with a rotisserie for preparing foods by the barbecue method of cooking. The rotisserie, of course, may be used either in connection with the charcoal fuel or with the electrical heat source. Essentially, the rotisserie comprises an elongated spit 64 having an outer handle 65 and an intermediately positioned roller collar 66. Collar 66 is adapted to be rotatably positioned adjacent the inner end of a slot 67 formed through the end wall 22, the same opening forwardly in the same direction as the cooking chamber 25. The inner end of the spit 64 may be positioned through the opening 67 formed in a raised embossed collar 68 in the inner end wall 30 (see Figs. 3 and 9 of the drawings). When properly positioned through the opening in the collar 68, the end of the spit 64 actually fits into a complementary opening (not shown) in the end of a rotisserie shaft 69 which in turn is operationally connected by suitable gearing to a small electric motor 70 whereby the spit 64 is slowly but continuously rotated. As shown in Fig. 4 of the drawings the motor 70 is shown in conjunction with a rotor and gear box 71 which in turn is connected to the shaft 69. It should of course be obvious that the spit 64 may be readily removed in the conventional manner by merely pulling the same slightly to the right as viewed in the drawings of Figs. 1 and 2 until the end of the spit is disengaged from the opening 67. The entire spit may then be moved forward until the roller bearing collar 66 has emerged from the mouth of the slot 67 and the entire spit has likewise emerged from the open end of the cooking chamber 25. Of course, during the operational rotation of the spit the collar 66 acts as a roller bearing in the slot 67. It will further be obvious that the spit may be entirely removed when the device is being used as a broiler.

Turning now to the blower exhaust system of the device, as shown in Fig. 9 of the drawings, the cooking chamber atmosphere including smoke, fumes, odors, and the like, are drawn out of the chamber through the grid 50 by means of an evacuator "squirrel cage" 72 positioned within the scroll 51 of the blower. As shown in Figs. 4 and 9 of the drawings, the scroll 51 is secured to the inner wall 30 by any suitable means, as for example, spot welding 73 along the flange members 74. The scroll being cup shaped in cross section defines a chamber 75 within which is positioned the squirrel cage 72. Drawn into this chamber 75 in the direction indicated by arrows in Fig. 9 of the drawings is the atmosphere or products of combustion from the cooking chamber 25. Air is also drawn or blown into the chamber from the auxiliary chamber 32 in which is positioned the other electrical components of the device. For the purpose of cooling the motors 70 and 80, an auxiliary fan such as 76 may be provided mounted on the outer end of a motor shaft 78, the opposite end of which is secured to the squirrel cage rotor 78' as at 79 by any conventional means. The usual type electric motor such as 80 affords the means for rotating shaft 78. As shown in Figs. 4 and 9 of the drawings, the air from the chamber 32 is drawn or blown into the rotor chamber 75 in the direction indicated by arrows in Fig. 9 through the openings 81, said air being drawn into the chamber from the room atmosphere through suitable openings provided in the walls of the chamber.

All of the electrical components of the device are connected in suitable circuits and controlled by switch means in the manner indicated in Fig. 11 of the drawings. Thus, the blower 48 is connected by suitable leads such as 82 and 83 in a circuit controllable by a switch 84. The rotisserie motor 70 is likewise connected by suitable leads such as 84' and 85 within another circuit controllable by switch means 86 and both the upper receptacle 59 and the lower receptacle 62 are connected in parallel and then by suitable leads 87 and 88 in another circuit controlled by switch means 89. It should further be noted that a pilot light 90 may be connected across the receptacle circuit to serve as an indicator of the energizing of said receptacles. If desired, the pilot light 90 may be so connected in the circuits that the energizing of any of the several electrical components such as the rotisserie and blower may be thereby indicated. The switches 84, 86 and 89 may be actuated by means of push buttons such as 91 positioned to protrude through a front panel wall 92 as shown in Figs. 1, 2 and 4 of the drawings.

The power source for the electrical components of the device may, of course, comprise the usual electrical current furnished in the modern building through a wall receptacle which in turn may be connected to the various circuits hereinabove described by means of suitable cable leads such as 93 and 94.

For convenience and as an aid to the user a timing device such as 95 may be incorporated into the unit affixed to the panel 92 with a knob 96 protruding outwardly, said knob comprising the means for pre-setting the alarm of the timer in the usual conventional manner. The timer 95 may be of mechanical type or if desired may be connected into the rotisserie and receptacle circuits so that they automatically break the circuits at the expiration of any predetermined time.

Although the blower unit 48 is so designed as to efficiently evacuate the atmosphere of the cooking chamber 25, exhausting the same to the outside atmosphere through the exhaust grid 53, the door 33 has nevertheless been provided primarily to prevent splattering, etc. As indicated previously, the door is provided with a handle 36 mounted on a leg 97 of a latch strip 98. The other leg 99 of the latch strip protrudes inwardly in parallel spaced relationship with the inner side wall 29. A bottom outer edge portion of said strip 99 is formed with an arcuate slot 100 opening to the edge thereof. This slot 100 is adapted to cooperate with the shaft 101 of a headed bolt 102 for conveniently latching the door 33, the head 103 of the bolt serving to prevent excessive lateral displacement of the latch leg 99 (see Figs. 6 and 7).

Directing attention now to Figs. 2 and 3 of the drawings, it should be noted that the grille 41 on which the food is supported during the cooking operation, is provided with auxiliary bottom support members such as 104 so positioned as to incline the grille 41 downwardly in a direction toward door 33. The reason for so tilting the grilles is to prevent the fat and juices from the cooked meat from dripping down onto the charcoal C. Excessive dripping increases the spattering and produces unpleasant additional smoke, fumes, and odors. In practice, it has been found that the juices and fats from the cooking meat run down the grille bars to the lower point of the grille and then drip down into the drip pan 43, missing the charcoal C. It is, of course, a simple matter to periodically remove the drip pan 43 in the manner shown in dotted outline in Figs. 3 and 8 of the drawings, for removal of any collected excessive grease.

For convenience in removing the fuel pan 42, a removable handle 105 may be provided, said handle formed with a hook-like portion 106 at an end thereof by means of which the handle may be removably mounted on the front wall of the pan 42 as shown in Fig. 8 of the drawings. The hot pan may then be removed without necessitating direct handling of said pan. The above described handle is similar to that disclosed in the aforementioned copending application.

The entire device may be supported on short table legs such as 107 which are, of course, primarily useful where the device is used as a table broiler or rotisserie.

When it is desired to use the device as a charcoal broiler or rotisserie the device is conveniently carried by means of a pair of side handles such as 108 for mounting the entire device in a window as illustrated in Fig. 1 of the drawings. For this purpose, it will be noted that a downwardly directed hook-like flange 108' is provided along the top edge of the rear wall 20. This flange 108' is adapted to cooperate with a complementary-shaped upwardly-directed flange 109 formed on the bottom edge of a top horizontal strip 110 of the window bracket 12. The window bracket 12 affords a central opening 111 the size of which is sufficient to accommodate therein at least a substantial portion of the rear wall 20 of the cooking unit 14 so that the exhaust grid 53 is positioned through the opening, thereby permitting the exhausted cooking chamber atmosphere, fumes and smoke to be exhausted directly to the ouside atmosphere.

In addition to the top strip 110, the opening 111 is defined by a bottom strip 112 and a pair of side strips such as 113. This rectangular-shaped enclosure, in turn, may be affixed in slidable relationship to a pair of outer panel members such as 114 by means of studs such as 115 adapted to protrude through aligned slots such as 116. Thus, the panel 12 may be extended within limits to the necessary width for completely filling the window opening.

When it is desired to remove the unit 14 from the window the device is merely lifted by the side handles 108 until the bottom edge of the flange 108' clears the top edge of the flange 109. For the purpose of insuring a closed, substantially airtight relationship between the rear wall 20 of the unit 14 and the mounting panel 12, the marginal edges of the opening 111 may be provided with strips of a compressible suitable sealing material such as 117. In order to maintain the unit in a truly level position while the same is mounted on the mounting panel 12 the bottom marginal edge of the opening 111 may be flanged outwardly as at 118, the width of said flange 118 being equivalent to the width of the upper hook member 109. Thus, the bottom edge of the back wall 20 bears against the outwardly protruding flange 118 and the entire device 14 is thereby maintained in a level position, the same as if the device were supported by the legs 107 on a level table top.

It should be apparent from the above description and drawings that I have provided a simply constructed, portable, blower-exhausted combination broiler-rotisserie cooking unit capable of being heated selectively by electricity or by ignitable fuel, such as charcoal. The unit affords means for both electric and charcoal broiling indoors as well as outdoors during warm weather. It is designed so that when used as an electrically heated device it may be positioned in the conventional manner on a table top, or when the fuel used is charcoal, it may be mounted in a building opening such as a window. In the latter position the fumes, smoke and other products of combustion and cooking are collected and exhausted to the outside atmosphere while effectively preventing the escape thereof to the inside room atmosphere. The unit is provided with a removable electric heating element which may be moved from its normal operational position to a position where it may serve as an electrical igniter for the combustible fuel. Various appliances and control aids such as timers, pilot lights, etc., may be incorporated into the device.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letter Patent of the United States is:

1. A portable combination electric and combustible fuel cooking appliance comprising an insulated housing including a back wall, said back wall being formed with an exhaust outlet, said housing having a cooking chamber therein, a combustible fuel filled container removably positioned in said cooking chamber, electrical heating means mounted in said housing and extending into said cooking chamber for selectively igniting said combustible fuel and affording a cooking heat source, power-driven exhaust means positioned in said housing in registry with said exhaust outlet, a building exterior wall having an opening, first mounting means positioned on said housing, and second mounting means positioned in said exterior wall opening, said second mounting means removably mounting said appliance with said exhaust outlet in registry with said exterior wall opening and said back wall in alignment with said exterior wall whereby the atmosphere of said cooking chamber may be exhausted to the outdoors through said exhaust outlet.

2. The portable cooking appliance of claim 1 in which said housing has a second chamber therein, said second chamber and cooking chamber being separated by a common wall therebetween, said common wall being formed with an exhaust opening, said exhaust means being positioned in said second chamber with its intake in registry with said exhaust opening.

3. The portable cooking appliance of claim 1 in which said second mounting means comprises a mounting panel positioned in said exterior wall opening and a mounting member positioned on said mounting panel, and said first mounting means is positioned on said back wall.

4. The portable cooking appliance of claim 3 in which said mounting panel comprises a plurality of panel members and strips slidably arranged to define a central opening of complementary configuration with said back wall, said mounting member comprises an upwardly directed flange positioned adjacent the top of said central opening, and said first mounting means comprises a downwardly directed complementary flange positioned along the top of said back wall.

5. The portable cooking appliance of claim 2 in which a pair of heating element receptacles are positioned on said common wall, one of said receptacles positioned near the top of said common wall and the other near the bottom thereof, said receptacles connected in parallel in an electrical circuit, said electrical heating means comprising a rod having a male plug at one end, each of said receptacles selectively and removably accommodating said plug whereby the rod may serve as a cooking heat source when plugged into the upper receptacle and as a fuel igniter when plugged into the lower receptacle.

6. A portable indoor combination electric and charcoal cooking device having means for removably mounting the same in a wall opening of a building comprising; a rectangular double-walled housing having a cooking chamber opening to the front thereof, a hinged door closing said opening, said cooking chamber defined by a pair of inner side walls, and inner rear, top and bottom walls, at least two pairs of support brackets mounted in aligned spaced-apart positions on said side walls, a grille removably positionable on said pairs of brackets, one of said inner side walls having a grid-covered opening formed therethrough, a motor-driven exhaust blower positioned adjacent the outer side of said inner wall with its intake aligned with said grid-covered opening, a charcoal filled container positioned at the bottom of said cooking chamber, a pair of electrical receptacles positioned one near the top of said inner side wall and one near the bottom thereof, said receptacles connected in parallel in an electrical circuit, a heating rod having a male plug at one end selectively positioned in said receptacles so that the rod extends across a substantial portion of the width of said cooking chamber, said heating rod comprising means for igniting the charcoal when positioned in the receptacle near the bottom of said inner side wall, and a portion of the rear wall of said housing having a grid-covered exhaust opening associated with the exhaust end of said blower.

7. The cooking device of claim 6 having a motor-driven rotisserie associated therewith, said rotisserie including a removable spit extending across said cooking chamber approximately equidistantly spaced between said receptacles, said blower and rotisserie connected in suitable electrical circuits, all of said circuits controlled by switches, said switches operable from an accessible position exterior of said housing.

8. The cooking device of claim 7 having a timing device and a pilot light incorporated therein, said pilot light associated with said circuits whereby to indicate the energizing of the same, said timing device and pilot light positioned in a readily accessible and visible location on the front of said housing.

9. A portable combination electric and charcoal broiler having means for mounting the same in a wall opening of a building comprising; a rectangular double-walled housing having a cooking chamber opening to the front thereof, said housing defined by inner and outer side, rear, top and bottom walls, said rear walls being formed with an exhaust outlet, one pair of said side walls spaced apart sufficiently to afford an auxiliary chamber, electrical heating means incorporated in said housing and positioned to afford selective heating means for said cooking chamber, a container positioned near the bottom of said cooking chamber, said container adapted to support combustible fuel affording alternate selective heating means for said cooking chamber, the inner of said latter-mentioned side walls having a grid-covered opening formed therethrough, a motor-driven rotisserie mounted in said housing, said rotisserie having a removable spit extending across said cooking chamber and a motor positioned in said auxiliary chamber, a blower mounted in said auxiliary chamber, said blower comprising a squirrel-cage rotor mounted on one end of a shaft, said rotor mounted in a scroll, said scroll mounted on said inner side wall with its intake in registry with said grid covered opening, and its exhaust end in registry with said exhaust opening, a motor and a fan mounted on the other end of said shaft, said rotor adapted to collect the atmosphere of said cooking chamber and exhaust the same to the outside atmosphere through said exhaust outlet, said fan adapted to cool said motors by circulating unheated air in said auxiliary chamber and said rotor further adapted to collect the air from said auxiliary chamber and exhaust the same to the outside atmosphere.

References Cited in the file of this patent

UNITED STATES PATENTS

| | | |
|---|---|---|
| 964,913 | Nensley | July 19, 1910 |
| 1,492,582 | Smith | May 6, 1924 |
| 2,114,698 | Babin | Apr. 19, 1938 |
| 2,180,459 | Earle | Nov. 21, 1939 |
| 2,211,940 | Stoner | Aug. 20, 1940 |
| 2,262,910 | Aller | Nov. 18, 1941 |
| 2,375,047 | Sutherland | May 1, 1945 |
| 2,376,571 | Brumbaugh | May 22, 1945 |
| 2,525,614 | Nelson | Oct. 10, 1950 |
| 2,705,450 | Steinbook | Apr. 5, 1955 |
| 2,831,420 | Radman | Apr. 22, 1958 |
| 2,862,095 | Scofield | Nov. 25, 1958 |

FOREIGN PATENTS

| | | |
|---|---|---|
| 324,695 | Great Britain | July 29, 1929 |